United States Patent

[11] 3,626,138

| [72] | Inventor | Forbes M. Hurley<br>Merrillville, Ind. |
|---|---|---|
| [21] | Appl. No. | 21,321 |
| [22] | Filed | Mar. 20, 1970 |
| [45] | Patented | Dec. 7, 1971 |
| [73] | Assignee | United States Steel Corporation |

[54] METHOD AND APPARATUS FOR WELDING AN OVERLAY ON A METAL BASE
1 Claim, 1 Drawing Fig.

| [52] | U.S. Cl. | 219/76, 219/73 |
|---|---|---|
| [51] | Int. Cl. | B23k 9/04 |
| [50] | Field of Search | 219/76, 73, 74, 130 |

[56] References Cited
UNITED STATES PATENTS

| 2,947,847 | 8/1960 | Craig et al. | 219/74 |
|---|---|---|---|
| 3,022,413 | 2/1962 | Johnson | 219/76 |

*Primary Examiner*—J. V. Truhe
*Assistant Examiner*—J. G. Smith
*Attorney*—Walter P. Wood ABSTRACT: A method and apparatus for welding an overlay on a metal base. The welding apparatus contains a supply of granular flux which feeds through a nozzle and covers the weld. An inert gas is introduced to the flux supply to purge it of air. The gas discharges through the nozzle and assists in protecting the weld. Particularly useful for welding an overlay of a nickel tantalum alloy.

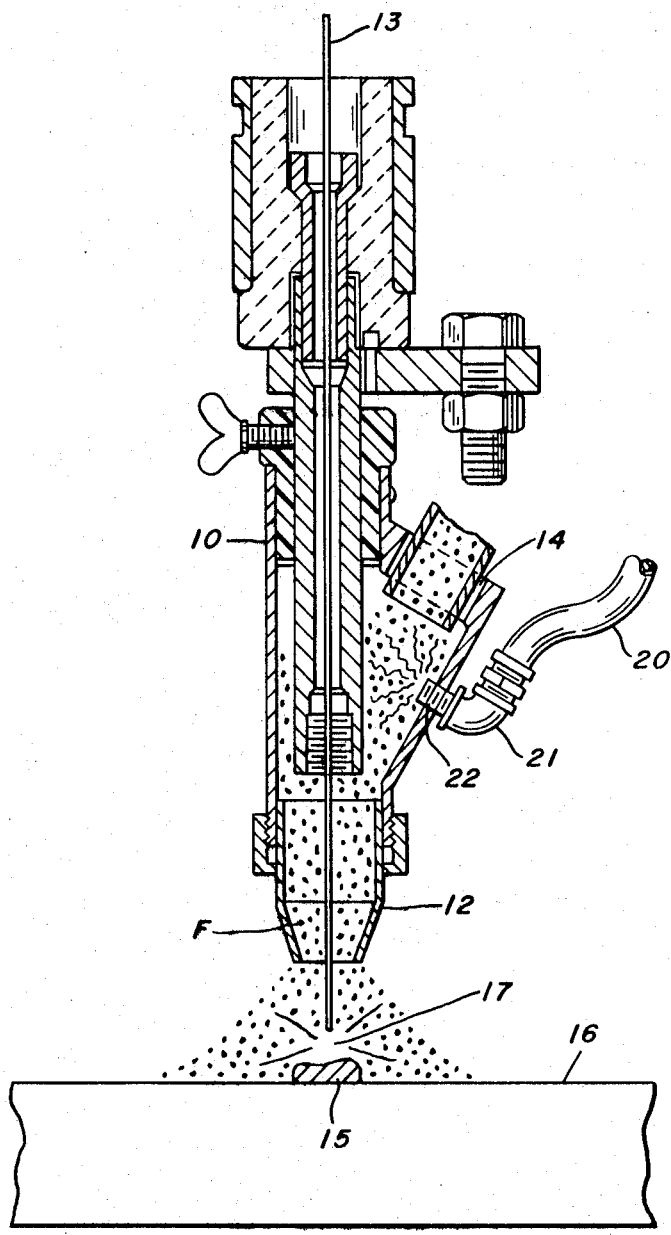

METHOD AND APPARATUS FOR WELDING AN OVERLAY ON A METAL BASE

This invention relates to an improved submerged-arc welding method and apparatus.

A known practice in submerged-arc welding is to feed granules of a metal over a base to which the weld is to be applied, feed a powdered flux over the granules, and strike an arc between a welding wire and the base. This practice is useful, for example, in welding an alloy facing over a carbon steel base. The granules and the wire are of different metals and fuse together during the welding operation to produce the desired alloy. Commonly the flux feeds directly into the arc through a nozzle which surrounds the wire or lies adjacent thereto. Examples of suitable fluxes are calcium borates or fluorides or carbonates. At the arc temperature the flux fuses into a monolithic adhering cover which shields the weld from atmospheric contamination until it cools.

Heretofore this practice has not been successful for welding granules of certain metals which have high melting points, such as tantalum, melting point about 5,430° F. An overlay of nickel-tantalum alloy on a carbon steel base affords a superior hard facing for a surface exposed both to wear and corrosive chemicals. Nickel melts at about 2,650° F., but must be heated to about 4,000° F. to dissolve tantalum. At such temperatures tantalum has a strong affinity for hydrogen and also oxidizes readily.

An object of my invention is to provide an improved submerged-arc welding method and apparatus which overcome the foregoing difficulty and make it possible to weld metals of high melting point.

A more specific object is to provide a welding method and apparatus in which I blanket the weld with an inert gas introduced through the flux, and purge air from the flux as it feeds to the weld.

In the drawing:

The single figure is a vertical sectional view of a welding apparatus constructed in accordance with my invention.

The drawing shows a welding apparatus which includes a hollow body 10 and a nozzle 12 fixed to the lower end of the body. A solid welding wire 13 extends axially through the body and nozzle. The interior of the body forms a chamber which contains a supply of granular flux F. One side of the body has an opening 14 through which the flux is introduced. I illustrate the apparatus as used to form a weld 15 as a hard facing on the surface of a metal base 16. A layer of metal granules (not shown) is placed on the base ahead of the weld. Electric leads (not shown) are connected to the welding wire 13 and base 16 for supplying welding current. An arc 17 is struck at the tip of the welding wire within the flux layer, which feeds through the nozzle and overlies the weld 15. The structure thus far described is known and not of my invention; hence I have not described it in greater detail.

In accordance with my invention, I connect a flexible pipe 20 to the body 10 through an elbow 21 and nipple 22. The nipple extends into the upper portion of the supply of flux F. I introduce inert gas to the flux through pipe 20. The gas purges the flux of air. The gas discharges through the nozzle 12 and aids in protecting the weld 15. Argon, which is my preferred gas, is heavier that air and effectively blankets the weld.

One example of an overlay which I can form by use of my invention if of the aforementioned nickel-tantalum alloy on a mild steel base. To form this overlay, I use a wire of 96 percent nickel and granules of −100 mesh tantalum. I feed a conventional calcium borate flux in granular form by gravity at a rate of about 100 pounds an hour, of which 30 to 45 pounds an hour is fused and the remainder reclaimed. I introduce inert gas to the flux granules at a rate of about 10 cubic feet per hour, which is about half the rate commonly used in welding processes where inert gas alone protects the weld. The nickel and tantalum fuse together and produce an alloy which consists essentially of about 60 percent nickel and 40 percent tantalum. This alloy forms an exceptionally hard wear-resistant facing on a steel base.

From the foregoing description, it is seen that my invention affords a simple effective method and apparatus for welding an overlay of metals which fuse only at high temperatures. I am aware that it is known to use either a flux or an inert gas to protect a weld, but I believe it is novel to combine the two in the way I have done so that the gas purges the flux of air.

I claim:

1. A method of welding an overlay of a nickel-tantalum alloy on a metal base in which an arc is truck between a nickel welding wire and a base, and the metal of the wire forms an alloy with granular tantalum metal placed on the base, said method comprising:

placing a supply of flux granules within a nozzle through which the wire extends directly above the are;

feeding flux granules through the nozzle over the weld as it is formed;

submerging the arc in the flux;

passing an inert gas through the flux supply in said nozzle to purge the flux of air before the flux feeds therefrom over the weld; and discharging the inert gas through said nozzle along with the flux to aid in protecting the weld; the resulting overlay consisting essentially of about 60 percent nickel and 40 percent tantalum.

* * * * *

UNITED STATES PATENT OFFICE
CERTIFICATE OF CORRECTION

Patent No. 3,626,138              Dated December 7, 1971

Inventor(s) Forbes M. Hurley

It is certified that error appears in the above-identified patent and that said Letters Patent are hereby corrected as shown below:

Column 2, line 12, "if" should read -- is -- ; line 33, "truck" should read -- struck -- ; line 38, "are" should read -- arc -- .

Signed and sealed this 31st day of October 1972.

(SEAL)
Attest:

EDWARD M. FLETCHER, JR.           ROBERT GOTTSCHALK
Attesting Officer                    Commissioner of Patents